(12) United States Patent
Rapp et al.

(10) Patent No.: US 8,617,434 B2
(45) Date of Patent: Dec. 31, 2013

(54) ADDITIVE FOR DIELECTRIC FLUID

(71) Applicant: Cooper Industries, Inc., Houston, TX (US)

(72) Inventors: Kevin J. Rapp, Oak Creek, WI (US); Jerry L. Corkran, Waukesha, WI (US); Gary A. Gauger, Franklin, WI (US); Charles P. McShane, Waukesha, WI (US)

(73) Assignee: Cooper Industries, LLC, Houston, TX (US)

( * ) Notice: Subject to any disclaimer, the term of this patent is extended or adjusted under 35 U.S.C. 154(b) by 0 days.

(21) Appl. No.: 13/724,659

(22) Filed: Dec. 21, 2012

(65) Prior Publication Data

US 2013/0113588 A1     May 9, 2013

Related U.S. Application Data

(60) Division of application No. 13/349,799, filed on Jan. 13, 2012, now Pat. No. 8,361,351, which is a continuation of application No. 12/889,097, filed on Sep. 23, 2010, now Pat. No. 8,097,187, which is a continuation of application No. 12/422,864, filed on Apr. 13, 2009, now Pat. No. 7,815,821, which is a continuation of application No. 10/677,635, filed on Oct. 2, 2003, now Pat. No. 7,524,440.

(51) Int. Cl.
*H01B 3/20*     (2006.01)

(52) U.S. Cl.
USPC .............. 252/570; 252/579; 336/58; 336/94; 174/17 LF

(58) Field of Classification Search
USPC ........................................................ 252/570
See application file for complete search history.

(56) References Cited

U.S. PATENT DOCUMENTS

| | | | |
|---|---|---|---|
| 1,989,046 | A | 1/1935 | Robinson |
| 2,688,569 | A | 9/1954 | Malone et al. |
| 2,825,651 | A | 3/1958 | Loo et al. |
| 4,204,181 | A | 5/1980 | Smith et al. |
| 4,384,972 | A | 5/1983 | Nakamura et al. |
| 4,429,345 | A | 1/1984 | Vincent |
| 5,736,915 | A | 4/1998 | Goedde et al. |
| 5,766,517 | A | 6/1998 | Goedde et al. |
| 6,037,537 | A | 3/2000 | McShane et al. |
| 6,154,357 | A | 11/2000 | Berger |

(Continued)

FOREIGN PATENT DOCUMENTS

| | | |
|---|---|---|
| EP | 1754236 A1 | 2/2007 |
| GB | 134322 A | 1/1974 |
| GB | 1428746 A | 3/1976 |

OTHER PUBLICATIONS

Notification of Transmittal of the International Search Report and the Written Opinion, dated Oct. 5, 2005, International Application No. PCT/US04/32376.

(Continued)

*Primary Examiner* — Necholus Ogden, Jr.
(74) *Attorney, Agent, or Firm* — Shumaker & Sieffert. P.A.

(57) ABSTRACT

A dielectric fluid comprising hydrocarbon liquid admixed with an ester-based compound, wherein the ester-based compound is present in an effective amount to impart breakdown inhibiting properties to a paper insulation material when the dielectric fluid is in contact with the paper material.

14 Claims, 8 Drawing Sheets

(56) References Cited

U.S. PATENT DOCUMENTS

| | | | |
|---|---|---|---|
| 6,177,031 B1 | 1/2001 | Minnick et al. | |
| 6,312,623 B1 | 11/2001 | Oommen et al. | |
| 6,398,986 B1 * | 6/2002 | McShane et al. | 252/579 |
| 6,485,659 B1 | 11/2002 | Goedde et al. | |
| 6,613,250 B2 | 9/2003 | McShane et al. | |
| 6,726,857 B2 | 4/2004 | Goedde et al. | |
| 7,524,440 B2 | 4/2009 | Rapp et al. | |
| 7,815,821 B2 | 10/2010 | Rapp et al. | |
| 8,097,187 B2 | 1/2012 | Rapp et al. | |
| 8,361,351 B2 | 1/2013 | Rapp et al. | |
| 2002/0109128 A1 | 8/2002 | McShane et al. | |
| 2003/0164479 A1 | 9/2003 | Goedde et al. | |

OTHER PUBLICATIONS

International Preliminary Report on Patentability for corresponding International Application No. PCT/US04/32376, dated Feb. 9, 2006.

McShane et al., "Aging of Paper Insulation in Natural Ester Dielectric Fluid," IEEE/PES T&D Conf. Oct. 2001, No. 0-7803-7287-5/01.

ASTM D 828, entitled "Standard Test Method for Tensile Properties of Paper and Paperboard Using Constant-Rate-of-Elongation Apparatus," Annual Book of ASTM Standards, American Society for Testing and Materials, 1997.

ASTM D4243, entitled Standard Test Method for Measurement of Average Viscometric Degree of Polymerization of New and Aged Electrical Papers and Boards, Annual Book of ASTM Standards, American Society for Testing and Materials, 1999.

ASTM D3277, entitled Standard Test Method for Moisture of Oil Impregnated Cellulosic Insulation, Annual Book of ASTM Standards, American Society for Testing and Materials, 1995.

ASTM D3612 (Method C), entitled "Standard Test Method for Measurement of Analysis of Gases Dissolved in Electrical Insulating Oil by Gas Chromatology," Annual Book of ASTM Standards, American Society for Testing and Materials, 2001.

EP Examination Report from corresponding EP application No. 04809836.2, dated Aug. 4, 2011, 3 pp.

McShane et al., "Experience in Retrofilling Older Transformers with Natural Ester based Dielectric Coolant," International Conference of Doble Clients, Boston, Massachusetts, Apr. 7, 2002, http://www.cooperpower.com/library/pdf/Doble001.pdf.

Extended European Search Report from corresponding European application No. 12188484.5, dated Jan. 9, 2013, 7 pp.

* cited by examiner

ADDITIVE FOR DIELECTRIC FLUID

This application is a divisional application of U.S. patent application Ser. No. 13/349,799, filed on Jan. 13, 2012, which is a continuation application of U.S. patent application Ser. No. 12/889,097, filed on Sep. 23, 2010, which is a continuation application of U.S. patent application Ser. No. 12/422,864, filed on Apr. 13, 2009, and is entitled ADDITIVE FOR DIELECTRIC FLUID, which is a continuation application of U.S. patent application Ser. No. 10/677,635, filed Oct. 2, 2003, and is entitled ADDITIVE FOR DIELECTRIC FLUID, the entire contents of which are incorporated herein by reference.

TECHNICAL FIELD

This invention relates to dielectric coolants, or insulating oils, for use in electrical distribution and power equipment, including transformers.

BACKGROUND

Many types of electrical power distribution equipment, including transformers, regulators, and switchgear, utilize insulated conductors operating at a high voltage. Generally, high voltage electrical equipment incorporates a solid insulating material, such as a polymeric or a porous material, impregnated with a dielectric fluid, such as mineral oil. Paper is a common form of solid insulation that is used in electrical equipment containing mineral oil dielectric fluids. Over time, the paper insulation, which is generally made from pulp fibers that contain cellulose and to a varying extent lignin and hemicellulose, begins to degrade. The rate that the paper insulation degrades is primarily dictated by temperature and the amount of water present in the paper. As paper thermally ages, the molecular weight of the cellulose fibers decreases along with its mechanical properties (e.g., tensile strength). Thermal degradation of the cellulose-based insulation materials also liberates water. One undesirable consequence of liberating water is that it further accelerates the degradation process. The presence of water in electrical distribution equipment is also undesirable as it causes the dielectric strength of the mineral oil to fall as the saturation point of water present in the oil is reached. Thus, the useful lifetime of high voltage electrical power distribution equipment is limited due to degradation of the paper insulation within the equipment housing.

SUMMARY

Additives and methods for extending the useful life of high voltage electrical distribution and power equipment are provided. The ester-containing additives of the invention can impart breakdown inhibiting properties to insulation paper that is typically used in electrical equipment. Such breakdown inhibiting properties include for example, removal of moisture from the paper insulation to thereby slow the thermal breakdown of the cellulose fibers. Advantageously, in accordance with certain embodiments, adding an amount of ester-containing additive in a dielectric fluid can significantly improve the durability of the paper insulation. In one embodiment, using a moderate amount, such as about 5 wt %, is sufficient to achieve the improved life.

In certain aspects, adding ester-containing compounds to a dielectric fluid directly can obviate the need for paper insulation to contain certain paper-modifying additives, which are frequently used to make the paper more resistant to thermal breakdown.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
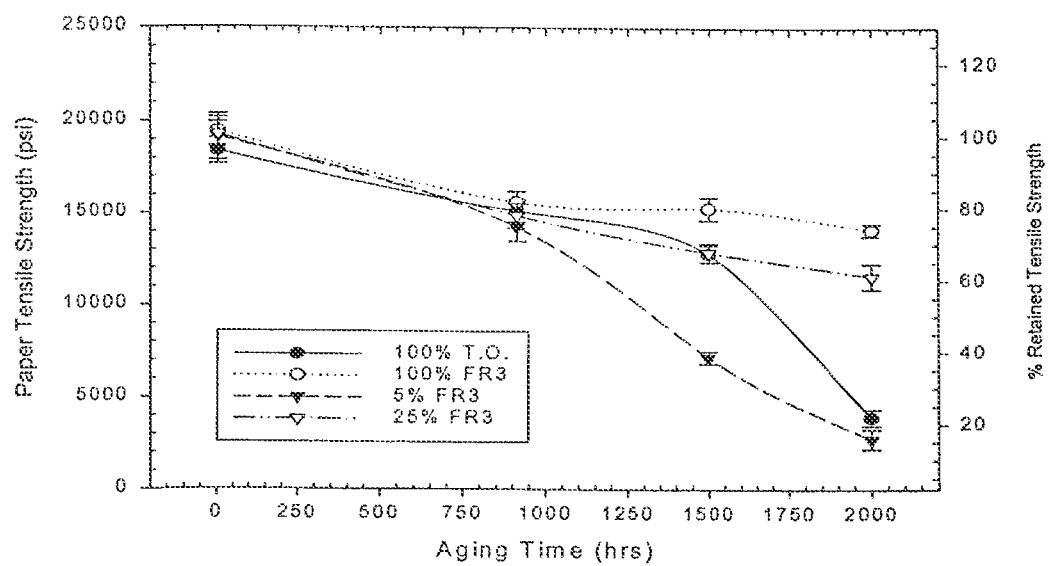
FIG. 1 is a graph representing tensile strength data at 160° C. aging, from Example 1.

Additives for fluids used in electrical distribution and power equipment are provided. Exemplary additives of the invention are ester-based. Blending an additive with currently available dielectric fluids can provide improved life and durability of paper insulation used in the oil-filled equipment.

Electrical distribution and power equipment such as transformers, regulators, and switchgear, generally use dielectric fluids in combination with paper insulation. The fluids are oils and often referred to as "dielectric coolants." Primarily, dielectric fluids are made from mineral oils derived from crude petroleum. These oils are typically used in electrical distribution and power equipment because of their low viscosities, high chemical and oxidative stability, long operable life and low cost. Synthetic polymers, (e.g., .alpha.-polyolefins) are also useful for dielectric fluids as they provide many of the same desirable properties as mineral oil based dielectric fluids.

Hydrocarbons such as mineral oils as well as synthetic polymers are generally hydrophobic and therefore known to have a low affinity for water and generally water insoluble. Electrical distribution and power equipment or devices that typically utilize paper insulation in combination with conventional dielectric fluids can therefore be susceptible to degradation of the paper insulation. The degradation is currently believed to be from residual water tending to stay in the paper insulation, where it can hydrolyze the cellulose fibers and degrade the insulation. There may also be other causes that are factors that affect paper degradation.

It has been found, in one embodiment, that adding moderate amounts of one or more ester-based compounds into hydrocarbon dielectric fluids (e.g. primarily mineral oil-based fluids) can increase the fluid's ability to retain water and, therefore, inhibit hydrolysis of the insulation. The hydrophilic character of the ester moiety provides moisture-absorbing properties. Additionally, transesterification (e.g., the exchange of an acyl group of one ester with that of another ester) of insulation material, such as cellulose, by certain ester-based additives can beneficially derivatize cellulose and form blocking groups that further inhibit the degradation process.

Ester-based compounds useful in embodiments of the invention generally exhibit properties that make them suitable for admixture with conventional dielectric fluids. For example, useful ester-based compounds can have an open-cup fire point significantly higher than conventional dielectric fluids as well as "less-flammable liquids" (e.g. fire point minimally 300° C., based on ASTM D92). Certain ester-based compounds for admixture into dielectric fluids can have viscosities between about 1 and about 16 cSt at 100° C. and less than about 215 cSt at 40° C. Further characteristics of suitable ester-based compounds include having heat capacities (e.g. specific heats) of greater than about 0.3 cal/g-° C. and dielectric strengths of greater than about 30 kV/100 mil gap (as defined in ASTM D877). Certain ester-based compounds can exhibit greater than 35 kV/100 mil gap. The dissipation factor of an ester-based compound can be less than about 0.5% at 25° C. in certain embodiments, the compound can have a dissipation factor of less than about 0.03% at 25° C. Ester-based compounds for admixture with dielectric fluids can also have higher water saturation points than mineral oil or synthetic polymers, such as over 500 ppm at room temperature.

Ester-based compounds suitable for adding to dielectric fluids have one or more hydrophilic ester moieties and can include natural compounds or synthetic ester-containing compounds. Natural ester-containing compounds include oils derived from animals, fruits, plants, seeds, or nuts, and can be edible or non-edible. Alternative sources for the oil can also include genetically modified seed sources such as an oleate-modified seed oil. Ester-containing oils derived from fruits or seeds of plants are typically referred to as "vegetable oils." Vegetable oils include mixed glycerides formed from the combination of a polyol (e.g., glycerin) having a number of hydroxyl groups that have been esterified with an equal or nearly equal number of fatty acid molecules. Many vegetable oils are triglycerides (i.e., glycerides having three fatty acid groups chemically bonded to the glycerin backbone).

The generalized formula for a triglyceride is:

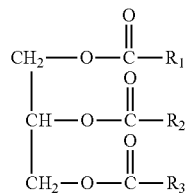

Substituents $R_1$, $R_2$, and $R_3$ can include an alkyl or alkenyl group that may be straight-chained or branched, saturated or unsaturated, and may be unsubstituted or may be substituted with one or more functional or non-functional moieties. $R_1$, $R_2$, and $R_3$ may be the same or different with carbon chains from $C_4$ to $C_{22}$ and levels of unsaturation from 0 to 4. Differences in functional properties of vegetable oils generally are attributable to the variation in the constituent fatty acid molecules. Examples of fatty acids include, for example, myristic, palmitic, stearic, oleic, linoleic, linoenic, arachidic, eicosenoic, behenic, erucic, palmitiolic, docosadienoic, lignoseric, tetracossenoic, margaric, margaroleic, gadoleic, caprylic, capric, lauric, pentadecanoic, arachidonic and heptadecanoic acids. Fatty acid molecules can be arranged on a polyol backbone in any number of ways, and each polyol can have one, two, or several different constituent fatty acid molecules. The three fatty acid molecules on a triglyceride molecule, for example, may be the same or may include two or three different fatty acid molecules. These fatty acid molecules and their corresponding vegetable oils can also vary in their degree of unsaturation.

An ester-based compound can be a vegetable oil having fatty acids that include at least one degree of unsaturation (i.e., at least one C=C bond). This can mitigate the effects of oxidation and help absorb evolved hydrogen gas that can occur under high electrical stress. Suitable vegetable oils for use in exemplary dielectric fluids of the invention include soya, sunflower, rapeseed, canola, corn, peanut, cottonseed, olive, safflower, jojoba, lesquerela, crambe, meadowfoam and veronia oils, as well as high oleic content versions of these oils. In particular, soya and sunflower oils as well as high oleic acid versions of these oils can be useful. A vegetable oil can be used alone or be blended together with one or more other vegetable oils.

The ester-containing compounds can include esters of short chain fatty acids, such as methyl esters, diesters and polyol esters. Methyl esters can be produced, for example, by esterification of fatty acids. Typically, a fatty acid is converted to a methyl ester using methanol in an acid or base catalyzed reaction. Alternatively, methyl esters are available commercially from, for example, Archer-Daniels Midland Corp., Decatur, Ill., or from Proctor and Gamble, New Milford, Conn. Diesters and polyol esters also can be used for admixture into dielectric fluid compositions. Exemplary diesters (e.g., esters produced by reacting monohydric alcohols), include those produced by reacting n-octyl, isooctyl, 2-ethylhexyl, isononyl, isodecyl, and tridecyl with dibasic acids, such as adipic, azaleic, sebacic, dodecanedioic, phthalic and dimeric. Thus, suitable non-limiting examples of diesters include adipates, azelates, sebacates, dodecanedioates, phthalates, dimerates and blends thereof. The resulting molecules may be linear and/or branched and/or aromatic, with two ester groups. As used herein, "polyol esters" refer to esters produced from polyols and contain from about 2 to about 10 carbon atoms and from about 2 to about 6 hydroxyl groups. Polyol esters can be made from transesterification of a polyol with methyl esters of short chain fatty acids. As used herein, "short chain fatty acid" refers to isomers of saturated or unsaturated fatty acids having chains of 4 to 12 carbons, including fatty acids containing odd or even numbers of carbon atoms. Some useful polyols contain two to four hydroxyl moieties. Non-limiting examples of suitable polyols include 1,2-propanediol, 1,3-propanediol, 1,2-butanediol, 1,3-butanediol, 2,3-butanediol, 2-ethyl-1,3-propanediol, 2-ethyl-2-butyl-1,3-propanediol, neopentyl glycol, 2,2,4-trimethyl-1, 3-pentanediol, trimethylolpropane (TMP), pentaerythritol and dipentaerythritol. Neopentyl glycol, trimethylolpropane, and pentaerythritol can be particularly useful.

Examples of synthetic ester-containing compounds include neopentyl glycol esters, trimethylolpropane esters, pentaerythritol esters, dipentaerythritol esters, and diesters. Trimethylolpropane (TMP) esters can include variations such as, for example, TMP tri(2-ethyl hexanoate), TMP triheptanoate, TMP di and/or trioctanoate, TMP trioleate, TMP tricaprylate, TMP tricaprate, TMP tripelargonate, and TMP triisononanoate. Suitable pentaerythritol (PE) esters include PE tetraisooctanoate, PE tetraoleate, PE tetrapelargonate, PE tetraoctanoate, PE tetra(2-ethyl hexanoate), PE dioctanate, and PE dilaurate. Some diesters like adipates and sebacates include, for example, diisodecyl adipate, diisotridecyl adipate and dioctyl sebacate. The examples of the synthetic ester-containing compounds above or combinations thereof are useful for admixture in the dielectric fluid compositions.

Synthetic esters may be used alone or may be blended together with one or more other vegetable oils and/or synthetic esters.

Other compounds or additives can also be included in a blend of dielectric fluid and ester-based additive. These include, and are not limited to, oxidation reducing agents, antimicrobial agents, cold flow modifiers and metal chelating agents. Oxidation reducing agents can include at least one compound that absorbs, or scavenges oxygen that could otherwise dissolve in the vegetable oil composition and result in oxidative breakdown of the oil. In some embodiments, it can be beneficial for an oxygen absorbing compound to be encased in a housing, such as a polymeric housing, where the housing is substantially permeable to oxygen and substantially impermeable to water. The agent can be formulated so that it is functional throughout the operating temperature range of the electrical equipment.

Oxidation reducing agents are compounds capable of reducing the concentration of free oxygen in the atmosphere surrounding the dielectric fluid that may be housed within an electrical distribution device. This consequently reduces the presence of dissolved oxygen in the dielectric fluid itself. Certain suitable oxygen scavenging compounds include those commonly employed in the food packaging industry. Exemplary agents include, for example, sodium sulfite; copper sulfate pentahydrate; a combination of carbon and activated iron powder; mixtures of hydrosulfite, calcium hydroxide, sodium bicarbonate and activated carbon; a metal halide powder coated on the surface of a metal powder; and combinations of alkali compounds, such as calcium hydroxide, with sodium carbonate or sodium bicarbonate. Mixtures and combinations of one or more of these are also useful.

Other oxygen scavenging compounds that can be an additive to dielectric fluids are compositions as described in U.S. Pat. No. 2,825,651. There, an oxygen scavenging composition is described and includes an intermixing of a sulfite salt and an accelerator such as hydrated copper sulfate, stannous chloride, or cobaltous oxide. Another useful class of oxygen scavenging compounds are those compositions comprising a salt of manganese, iron, cobalt or nickel, an alkali compound, and a sulfite or deliquescent compound, such as what is disclosed in U.S. Pat. No. 4,384,972.

Suitable oxygen scavenging compounds can include (or include as their base component) at least one basic iron oxide, such as a ferrous iron oxide, or are made of mixtures of iron oxide materials. Useful iron oxide-containing compositions are available commercially, for example, under the tradename AGELESS available from Mitsubishi Gas Chemical Co. (Duncan, S.C.) and those under the tradename FRESHMAX from Multisorb Technologies, Inc. (Buffalo, N.Y.). Also useful are oxygen absorbing agents comprising a mixture of ferrous salts and an oxidation modifier and/or a metallic sulfite or sulfate compound.

An antioxidant or an antimicrobial compound can also be added to a dielectric fluid along with the ester-based compound. Useful antioxidant compounds for this purpose can be dissolved directly in a dielectric fluid and include, for example, BHA (butylated hydroxyanisole), BHT (butylated hydroxytoluene), TBHQ (tertiary butylhydroquinone), THBP (tetrahydrobutyrophenone), ascorbyl palmitate (rosemary oil), propyl gallate, and alpha-, beta- or delta-tocopherol (vitamin E).

Antimicrobial additives can be used to inhibit the growth of microorganisms. Useful antimicrobial agents are those that are compatible with a dielectric fluid. In some cases, compounds that are useful as antioxidants also may be used as antimicrobials. For example, phenolic antioxidants such as BHA can also exhibit some activity against bacteria, molds, viruses and protozoa, particularly when used with other antimicrobial substances such as potassium sorbate, sorbic acid or monoglycerides. Vitamin E, ascorbyl palmitate are examples of suitable antimicrobial additives.

The presence of water, a polar contaminant, can have detrimental effects on dielectric performance. Water in a dielectric fluid can increase the rate of breakdown of fatty acid esters in a vegetable oil base in proportion to the amount of water available for the reaction. The most obvious indicator of such reactions is a significant increase in the value of the neutralization number due to the increased acidity of the fluid (ASTM D974). This reaction will lead to the formation of polar contaminants. The problem is compounded by the wide temperature range over which electrical distribution equipment must operate. Dielectric breakdown characteristics and other dielectric properties of mineral oils are generally directly related to the percent of saturation of water present. As the saturation point is reached, dielectric strength falls rapidly. The saturation point at room temperature for typical mineral oils used for dielectric fluids is approximately 65 ppm at room temperature, and over 500 ppm at nominal operating temperature, approx. 100° C. However, electrical distribution equipment is typically required to be able to operate over a wide temperature range, resulting in constant increases and decreases in the water content temperature necessary to achieve saturation. Water that is dissolved or in vapor/liquid equilibrium at a high operating temperature may precipitate or condense when the oil is brought to a lower temperature.

Standards typically require moisture removal from conventional hydrocarbon liquids to below 35 ppm for use in new distribution equipment. The moisture removal process uses either evaporation in a reduced pressure chamber, filtration, or both to a typical level of 15-25% saturation at room temperature (10-15 ppm) prior to filling the electrical distribution equipment. During operation, the additives of this invention increase the water saturation limits of conventional mineral oils, thereby preventing water from condensing out of solution upon thermal cycling.

The performance of dielectric fluids at low temperatures is important in some applications. Some ester-based additives do not, by themselves, have pour point values sufficiently low to be suitable for standard electrical power distribution applications. Vegetable oils may also solidify or gel when cooled to a temperature just slightly above their pour point temperature, particularly when cooled for an extended period of time. A typical electrical power distribution application can need a coolant to have a pour point below about −20° C. Thus, the addition of a pour point depressant can be included in blends of ester-based additive and dielectric fluid. This can help modify the dielectric fluid blend to achieve a flowability at moderately low temperatures, such as those typically encountered during off-cycles (lower than about −20° C.). Suitable pour point depressants include polyvinyl acetate oligomers and polymers; and acrylic oligomers and polymers.

Low temperature performance properties and characteristics may also be improved by judicious blending of oils. Certain oil blends, for example, have lower pour points than their individual constituent oils. For example, a blend of 25 percent by weight soya oil (I) with 75 percent by weight rapeseed oil (II) has a pour point of −24° C., compared with −15° C. and −16° C. for the individual constituent oils (I) and (II), respectively. Other vegetable oil blends that exhibit similarly advantageous reductions in pour points include, for example, 25% soybean oil+75% oleate modified oil; 50% soybean oil+50% oleate modified oil; and 25% soybean oil+75% sunflower oil.

According to embodiments of the invention, minor to moderate amounts of an ester-based compound can be blended with a major amount of one or more oils (e.g., vegetable, mineral) and/or synthetic polymers (e.g., .alpha.-polyolefins). Where the dielectric coolant compositions include standard electrical grade mineral oils, the mineral oils preferably meet the criteria of ASTM D3487. An additive preferably does not interfere with the beneficial properties of the dielectric fluid. The dielectric fluid can include about 1% by weight, and preferably greater than 5 wt % of an ester-based compound. In certain embodiments, the fluid can comprise less than 75 wt %, or also less than about 50% by weight of an ester-based compound (e.g. natural or synthetic ester or blend thereof). Certain blends can include between about 5% and about 25% by weight of an ester-based compound, with the balance being a petroleum-derived mineral oil or synthetic oil and appropriate co-additives, such as, for example, antioxidants and pour point depressants. Typically, co-additives are present in the dielectric fluid compositions in amounts totaling from about 0.1% to about 2.5% based on weight.

Dielectric fluid compositions that are blended with ester-based additives can have an open-cup fire point well above the accepted minimum standard (300° C.), viscosities between 2 and 15 cSt at 100° C. and less than 110 cSt at 40° C., and heat capacities (specific heats) greater than 0.3 cal./gm/° C.

Long term stability of a fluid and a paper insulation can also be enhanced by selection of most favorable blends, processing, and the addition of antioxidant and antimicrobial agents. Stability is further enhanced by controlling the environment to which the composition is exposed, particularly, minimizing oxygen, moisture and contaminant ingress into the tank, and by providing means for removing or capturing oxygen that might leak into the tank.

An additive and dielectric fluid blends that contain the additive are preferably introduced into the electrical equipment in a manner that minimizes the exposure of the fluid to atmospheric oxygen, moisture, and other contaminants that could adversely affect their performance. In many cases, it is preferable to minimize or eliminate the presence of oxygen in the headspace of the electrical equipment that contains the dielectric fluid including an ester-based additive. Achieving appropriate levels of moisture can be accomplished using one or more steps of: drying the tank contents, evacuating the air and substituting it with dry nitrogen gas, filling under partial vacuum, and immediate sealing of the tank. If the electrical device requires a headspace between the dielectric fluid and tank cover, after filling and sealing of the tank, the gas in the headspace can be evacuated and substituted with an inert gas, such as dry nitrogen, under a stable pressure of between about 2 and about 3 psig at 25° C.

The dielectric fluids of embodiments of the invention may be used to retrofill existing electrical equipment that incorporate other, less desirable dielectric fluids. These other fluids may be replaced with dielectric fluid compositions including ester-based additives using any suitable method known in the art. Retrofilling methods are known by those skilled in the art can be implemented.

The addition of an ester-based additive to a dielectric fluid can significantly improve the useful life of paper insulation used inside an electrical distribution or power equipment. Typically, paper insulation saturated with a dielectric fluid has a limited useful life of about 20 years. Depending on the conditions inside the electrical equipment however, the useful life can be detrimentally affected. Adding even moderate amounts of an ester-based additive according to the invention has been found to have significant benefits to the useful life of an electrical paper insulation. Various tests can be used to monitor the life of an aged paper insulation, where the results provide good indicators as to how well the insulation is holding up inside an electrical device. For example, CO and $CO_2$ gases are by-products of thermal degradation of paper. Therefore determining the amount of carbon-oxide gases that have dissolved in the dielectric oil can indicate the extent of degradation of the paper. Other tests that can be used include measuring the tensile strength of the aged paper, measuring the degree of polymerization, and the moisture content of the paper insulation. These tests are discussed below and have been used to demonstrate for illustrative non-limiting purposes, how an ester-based additive blended into a dielectric fluid can improve the life of paper insulation and thereby also benefit the performance of an electrical device that utilizes such an insulation and fluid system.

Test Procedures

ASTM 828, entitled "Tensile Properties of Paper and Paperboard Using Constant-Rate-of-Elongation Apparatus," was used to measure the tensile strength of the insulation paper.

ASTM D4243, entitled "Measurement of Average Viscometric Degree of Polymerization of New and Aged Electrical Papers and Boards," was used to determine the extent of polymerization of the paper.

ASTM D3277, entitled "Moisture of Oil Impregnated Cellulosic Insulation" was used to measure the amount of water in oil-impregnated electrical insulation.

ASTM D3612 (Method C), entitled "Analysis of Gases Dissolved in Electrical Insulating Oil by Gas Chromatography." was used to determine the amount of CO and/or $CO_2$ gas dissolved in electrical insulating oil.

The description and processing variables used for the aging vessel (sealed tube) are described in McShane et. Al., "Aging of Paper Insulation in Natural Ester Dielectric Fluid", IEEE/PES T&D Conf., October 2001, No. 0-7803-7287-5/01.

These tests provided insight as to how well a paper insulation aged in a dielectric fluid within an electrical distribution or power generation device. The test helped evaluate the various characteristics and properties of the paper insulation.

Example 1

Four different compositions were made and used in sealed tube aging tests:

| COMPOSITION | wt % Mineral Oil | % FR3 |
|---|---|---|
| A | 100 | 0 |
| B | 0 | 100 |
| C | 95 | 5 |
| D | 75 | 25 |

The mineral oil and ENVIROTEMP FR3 fluid were blended to provide compositions A through D. Accelerated aging was performed at two different temperatures, 160° C. and 170° C., and for various time periods (0 hrs, 900 hrs, 1500 hrs and 2000 hrs), for a total of 28 test samples.

The aforementioned compositions A through D, each combined separately with upgraded Kraft paper, aluminum strip, and copper strip, were thermally aged in sealed tubes. (The Kraft paper and sealed tubes are described in the above reference)

Tensile Strength

Figure 2:
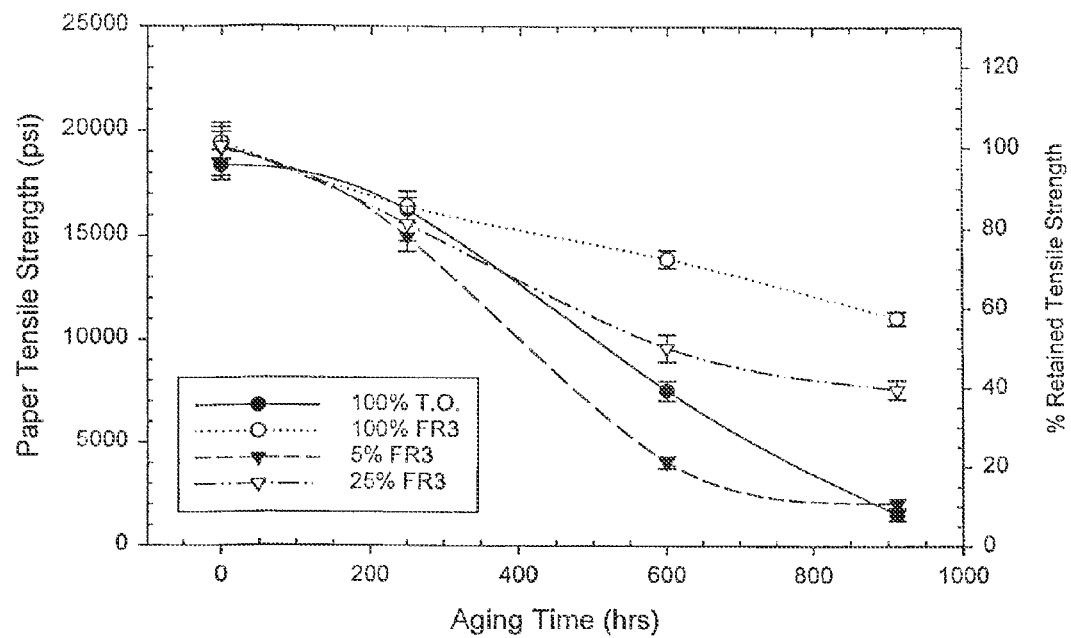
FIG. 2 is a graph representing tensile strength data at 170° C. aging, from Example 1.

FIGS. 1 and 2 are graphical representations of the tensile strength test results for paper aged at 160° C. and 170° C., respectively, using the test procedure described above. When a paper reaches 25% of its initial tensile strength, it is typically considered unsuitable for use and therefore considered to be at its "end of life."

As seen in the graphs, the paper soaked in composition D retained from 40 to 60 percent of its initial tensile strength by the end of the aging time. In contrast, the paper aged in comparative composition A was BEYOND its end of life BEFORE 2000 hrs of aging was complete. Referring to FIG. 2, it was observed that at 170° C., a slight improvement in the paper's ability to maintain tensile strength occurred when the paper was aged in composition C.

Degree of Polymerization

Data for this test was obtained by performing the test procedure described above.

Figure 3:
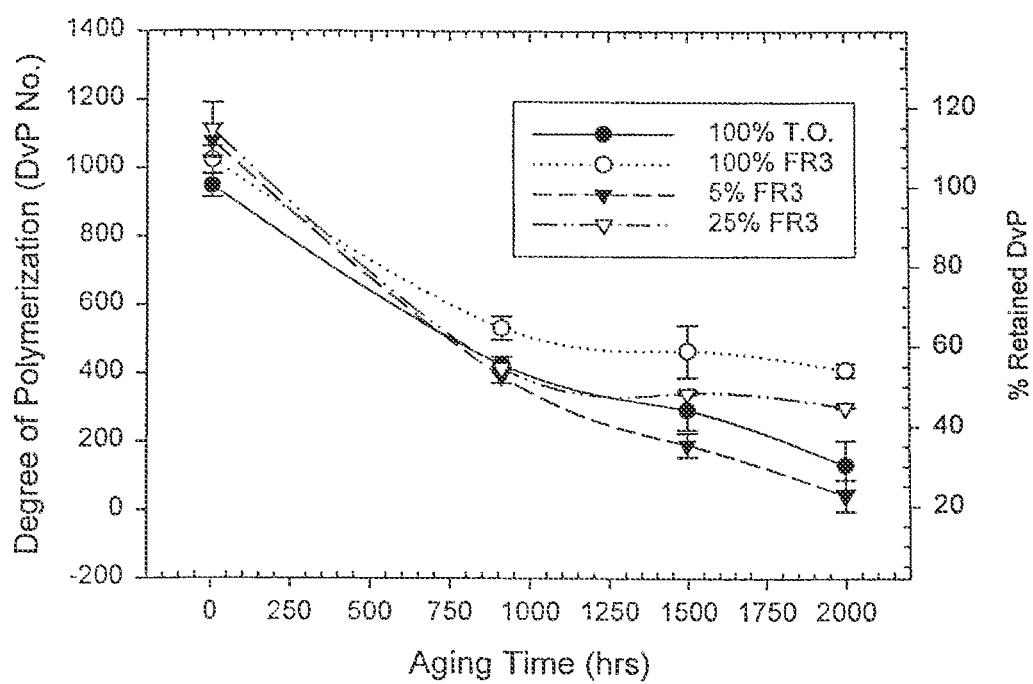
FIG. 3 is a graph representing degree of polymerization data from Example 1.
Figure 4:
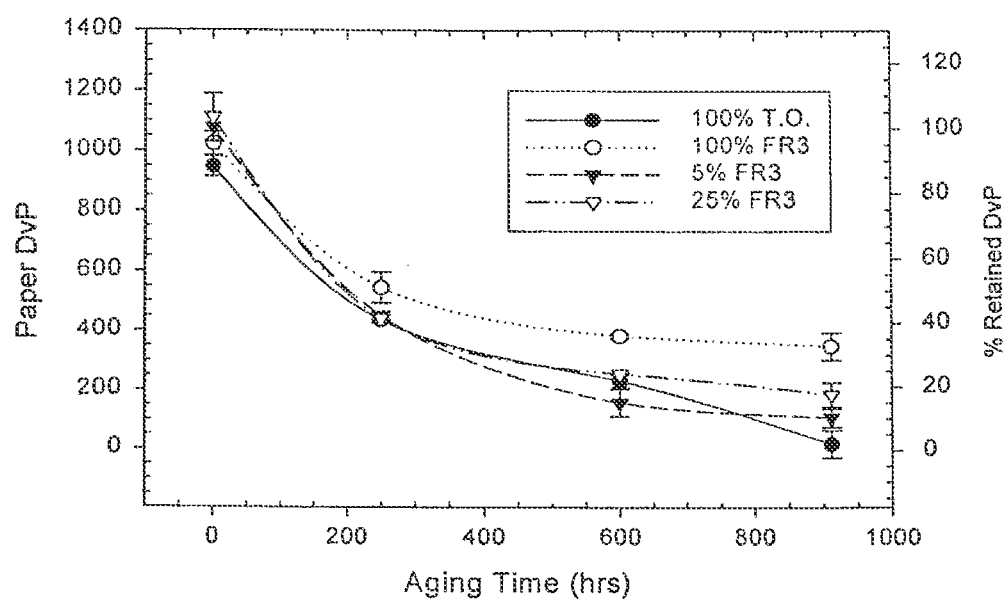
FIG. 4 is another graph representing degree of polmerization data from Example 1.

The results for the Degree of polymerization for the samples are graphically represented in FIGS. 3 and 4. It was observed that paper aged in composition D improved the life of the paper at both temperatures. Paper aged in composition C displayed an increase in percent retained degree of polymerization at 170° C. only.

Moisture

Figure 5:
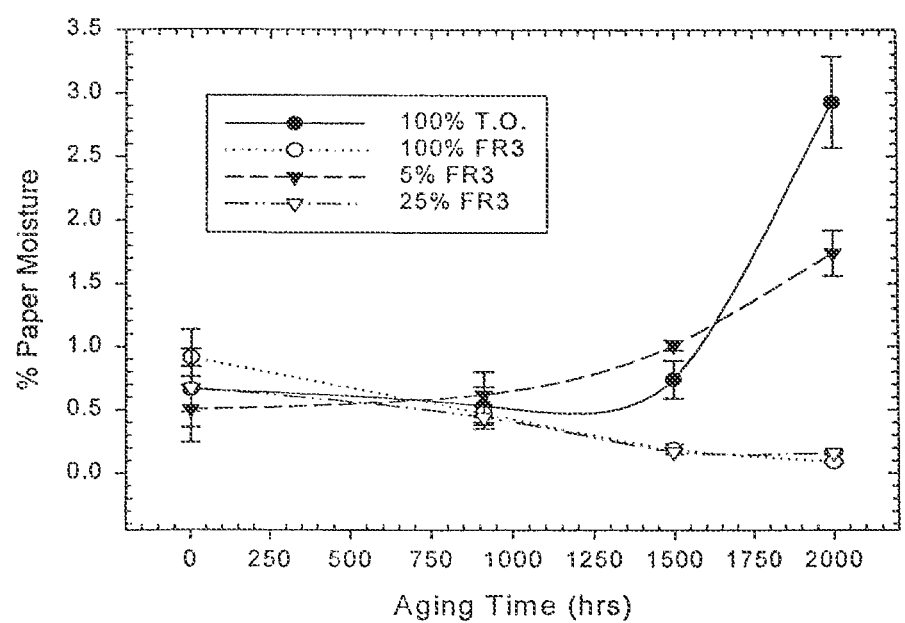
FIG. 5 is a graph representing water content in paper aged at 160° C., from Example 1.
Figure 6:
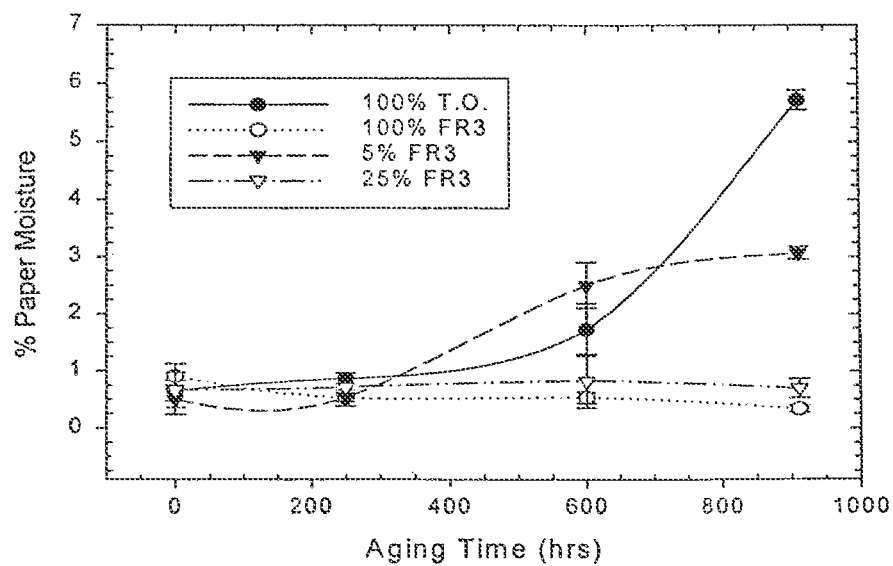
FIG. 6 is a graph representing water content in paper aged at 170° C., from Example 1.

Water, a by-product of thermal degradation of paper, is a good indicator for the durability of an insulating paper. As the molecular structure of paper breaks down due to heat or other factors, the water content of the paper will increase, particularly in mineral-based transformer oil. As the water content of the paper increases, so will the rate of paper degradation. This data was achieved using the test procedure described above. The results of this study show that even small amounts of additive to a dielectric coolant can limit the production of water and thereby slow down the rate of paper degradation. As seen in FIGS. 5 and 6, decreased levels of water in paper were found for samples using compositions C and D, at both temperatures.

Gas Evolution

Figure 7:
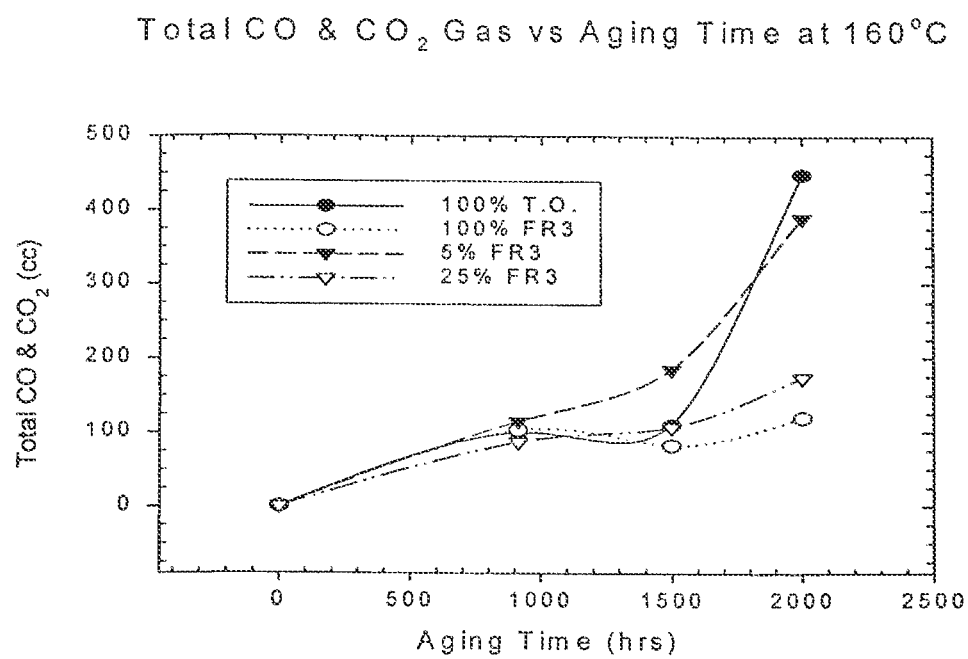
FIG. 7 is a graph representing the gas production data from Example 1.
Figure 8:
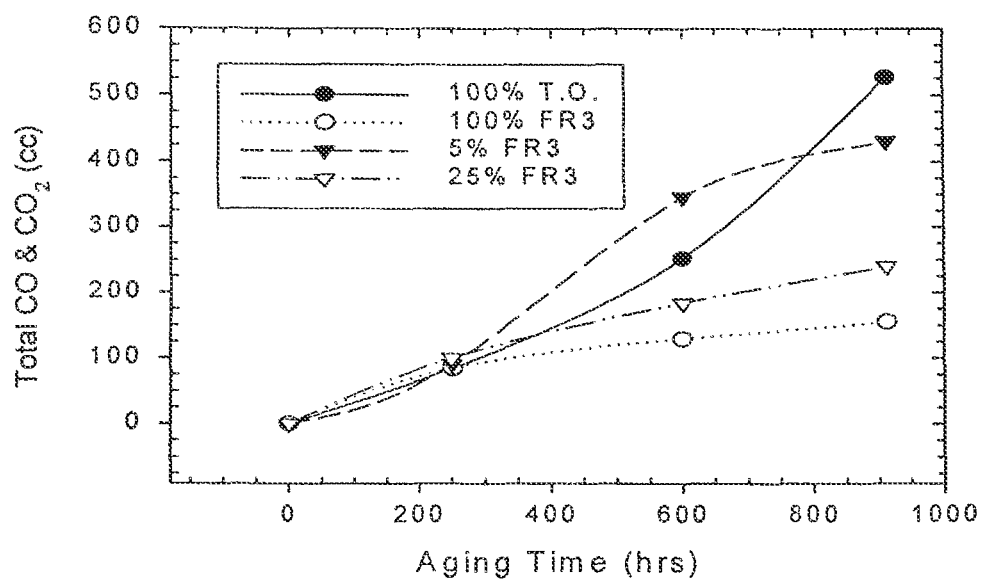
FIG. 8 is another graph representing the gas production data from Example 1.

Carbon monoxide (CO) and carbon dioxide ($CO_2$) are both by-products of thermal degradation of paper. The sum of these gases can indicate the relative degradation of the molecular structure of the insulating paper. The less gases produced, the less degradation of the paper. As seen in the results graphically presented in FIGS. 7 and 8, the addition of even small amounts of additive to a dielectric coolant can provide benefits by lowering the production of CO and $CO_2$ gas.

This data was achieved using the test procedure described above. Based on the results discussed above, the results obtained from the accelerated aging of electrical-grade Kraft paper in low percentage blends of Envirotemp FR3 fluid in mineral-based transformer oil (TO) show that the useful life of the paper can be extended. The improvement in the life of the paper was measured by both mechanical and chemical means. Furthermore, the measurements of water in paper and total CO and $CO_2$ indicate less paper breakdown in low percentage blends of FR3 in TO compared to 100% TO. While a 5% FR3 blend in TO only showed a slight improvement, a 25% FR3 blend in TO displayed a significant improvement in the life of the paper. The results of the accelerated aging study support our claim that low percentage quantities of ester-based fluids in mineral-based transformer oil will enhance the thermal aging characteristics of electrical insulating paper and will extend the life of the paper in an electrical device, such as a transformer.

It was found that dielectric coolants (insulating fluids) having about 5 to about 25 wt % additive, such as ENVIROTEMP FR3 can increase the life of an insulating paper used in electrical devices.

A number of embodiments of the invention have been described. Nevertheless, it will be understood that various modifications may be made without departing from the spirit and scope of the invention. Accordingly, other embodiments are within the scope of the following claims.

The invention claimed is:

1. An electrical power distribution device with a dielectric fluid therein, wherein the dielectric fluid comprises:
    (a) 1% to 75% by weight of a methyl ester of a saturated or unsaturated fatty acid, wherein the methyl ester is produced by reacting the fatty acid with methanol in an acid or base catalyzed reaction; and
    (b) the balance a petroleum derived mineral oil or a petroleum derived synthetic oil.

2. The electrical power distribution device of claim 1, wherein the dielectric fluid further comprises 0.1% to 2.5% by weight of at least one additive selected from an antioxidant, an antimicrobial agent, and a pour point depressant.

3. The electrical power distribution device of claim 1, wherein the fatty acid is selected from the group consisting of myristic, palmitic, stearic, oleic, linoleic, linoenic, arachidic, eicosenoic, behenic, erucic, palmitiolic, docosadienoic, lignoseric, tetracossenoic, margaric, margaroleic, gadoleic, caprylic, capric, lauric, pentadecanoic, arachidonic, heptadecanoic acids and combinations thereof.

4. The electrical power distribution device of claim 1, wherein the fatty acid has 4 to 12 carbon atoms.

5. The electrical power distribution device of claim 4, wherein the fatty acid is selected from the group consisting of caprylic, capric, and lauric, and combinations thereof.

6. The electrical power distribution device of claim 2, wherein the additive is an antioxidant.

7. The electrical power distribution device of claim 1, wherein the electrical device is a transformer.

8. The electrical power distribution device of claim 1, wherein the dielectric fluid comprises 5% to 50% by weight of the methyl ester.

9. The electrical power distribution device of claim 1, wherein the dielectric fluid comprises 5% to 25% by weight of the methyl ester.

10. The electrical power distribution device of claim 1, wherein the dielectric fluid comprises a petroleum-derived mineral oil.

11. The electrical power distribution device of claim 1, wherein the dielectric fluid comprises a petroleum derived synthetic oil.

12. The electrical power distribution device of claim 1, wherein the device is selected from at least one of transformers, regulators and switchgear.

13. An electrical power distribution device with a dielectric fluid therein, wherein the dielectric fluid comprises:
    (a) 5% to 50% by weight of a methyl ester of a saturated or unsaturated fatty acid with 4 to 12 carbon atoms, wherein the methyl ester is produced by reacting the fatty acid with methanol in an acid or base catalyzed reaction;
    (b) 0.1% to 2.5% by weight of at least one additive selected from an antioxidant, an antimicrobial agent, and a pour point depressant; and
    (c) the balance a petroleum derived mineral oil or a petroleum derived synthetic oil, wherein the electrical power distribution device is selected from at least one of transformers, regulators and switchgear.

14. The electrical power distribution device of claim 13, wherein the fatty acid is selected from the group consisting of caprylic, capric, and lauric, and combinations thereof.

\* \* \* \* \*